United States Patent
Kokubo

(10) Patent No.: US 9,956,686 B2
(45) Date of Patent: May 1, 2018

(54) DEFLECTION MEASUREMENT SYSTEM FOR MEASURING DEFLECTION OF ARTICULATED ROBOT

(71) Applicant: FANUC CORPORATION, Minamitsuru-gun, Yamanashi (JP)

(72) Inventor: Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 109 days.

(21) Appl. No.: 15/257,025

(22) Filed: Sep. 6, 2016

(65) Prior Publication Data
US 2017/0072562 A1 Mar. 16, 2017

(30) Foreign Application Priority Data
Sep. 15, 2015 (JP) ................... 2015-181636

(51) Int. Cl.
*G05B 19/04* (2006.01)
*G05B 19/18* (2006.01)
*B25J 9/16* (2006.01)

(52) U.S. Cl.
CPC ... *B25J 9/1638* (2013.01); *G05B 2219/39176* (2013.01)

(58) Field of Classification Search
CPC ............. B25J 9/1638; G05B 2219/39176
USPC ......................................... 700/254
See application file for complete search history.

(56) References Cited

U.S. PATENT DOCUMENTS

| 5,049,797 A * | 9/1991 | Phillips ............... B25J 9/1635 318/568.16 |
| 5,418,441 A * | 5/1995 | Furukawa ........... B25J 9/1641 318/568.22 |
| 2008/0297092 A1 * | 12/2008 | Nihei ................ B25J 9/1633 318/568.22 |
| 2012/0239194 A1 * | 9/2012 | Kagawa ............. B25J 9/1692 700/254 |
| 2015/0051735 A1 * | 2/2015 | Tanaka .............. B25J 9/1638 700/262 |
| 2015/0202776 A1 * | 7/2015 | Atohira ............. G06F 17/5009 700/259 |
| 2017/0028555 A1 * | 2/2017 | Kokubo ............. B25J 9/1607 |

FOREIGN PATENT DOCUMENTS

| JP | 2002-307344 A | 10/2002 |
| JP | 2010-058256 A | 3/2010 |
| JP | 2011-125956 A | 6/2011 |
| JP | 2013-244540 A | 12/2013 |

* cited by examiner

*Primary Examiner* — Harry Y Oh
(74) *Attorney, Agent, or Firm* — RatnerPrestia

(57) ABSTRACT

A measured mark is arranged on a link of an articulated robot. A camera for measuring a position of the measured mark is arranged at a position distant from the articulated robot. A control apparatus of the articulated robot changes posture of the articulated robot, measures positions of the measured mark respectively before and after a change of the posture by the camera, and calculates an actual deflection amount of the link based on a movement amount between the position of the measured mark measured before the change of the posture and the position of the measured mark measured after the change of the posture.

6 Claims, 9 Drawing Sheets

DEFLECTION MEASUREMENT SYSTEM FOR MEASURING DEFLECTION OF ARTICULATED ROBOT

BACKGROUND OF THE INVENTION

1. Field of Invention

The present invention relates to a deflection measurement system for measuring deflection of each joint axis and a link between the joint axes of an articulated robot.

2. Description of the Related Art

It is known that mechanism units such as respective joint axes and links between the joint axes in articulated robots are elastically deformed by weight of tools attached to tip ends of robot arm units. Such elastic deformation affects positioning accuracy of the tip ends of robot arm units, and conventionally, positions (angles) of the robot arm units are controlled in consideration of the elastic deformation of the joint axes, the links, and the like.

For example, according to the invention described in Japanese Laid-open Patent Publication No. 2002-307344, a joint axis is regarded as a rotational spring, and a spring constant of the joint axis about a coordinate axis of a coordinate system defined on the joint axis is measured and set in advance. A deflection amount of the joint axis about the coordinate axis is calculated from the set spring constant and torque acting on the joint axis about the coordinate axis, and a target position of the robot arm unit is corrected based on the deflection amount.

When the target position of the robot arm unit is corrected, the spring constant of the joint axis is set in advance as described above. Various methods are proposed for determining the spring constant of the joint axis in advance, and there are determination methods of the spring constant disclosed, for example, in the following Japanese Patent Applications Laid-open No. 2010-058256, No. 2013-244540, and No. 2011-125956.

According to the invention disclosed in Japanese Patent Application Laid-open No. 2010-058256, first, a shift amount between a commanded angle provided as a target position from a control apparatus to a joint axis of a robot and a rotation angle of the joint axis actually measured is calculated. Then, torque acting on the joint axis is calculated, and a spring constant of the joint axis is calculated based on the calculated shift amount of the angles and the calculated torque.

According to the invention disclosed in Japanese Patent Application Laid-open No. 2013-244540, an angle confirmation position is disposed on each of two arm units connected to a joint axis of a robot, and a control unit rotates the joint axis to align the angle confirmation positions of both arm units. At the time of the aligning, a difference between a commanded position (angle) supplied from the control unit to the joint axis and a theoretical commanded position (angle) necessary for the above-described aligning on the assumption that the joint axis is not deflected is calculated as a deflection correction amount. Further, a value obtained by dividing the deflection correction amount by load torque acting on the joint axis is defined as the spring constant.

According to the invention disclosed in Japanese Patent Application Laid-open No. 2011-125956, first, two weights having different mass are alternately attached to a tip end of a robot arm unit, and a deflection amount in a rotation direction of the robot arm unit connected to the joint axis is measured for the respective weights. The spring constant of the joint axis is calculated from a difference between the masses of the above-described two weights and a difference between the deflection amounts of the arm unit measured for the respective weights.

However, the determination methods of the spring constant disclosed in Japanese Patent Applications Laid-open No. 2010-058256, No. 2013-244540, and No. 2011-125956 each have the following problems.

According to the invention disclosed in Japanese Patent Application Laid-open No. 2010-058256, when the commanded angle is supplied from the control apparatus to the joint axis, an actual rotation angle of the joint axis needs to be measured. Thus, an operation to attach a rotation angle sensor to the joint axis arises, which costs money.

According to the invention disclosed in Japanese Patent Application Laid-open No. 2013-244540, the theoretical commanded position (angle) of the joint axis needs to be preliminarily determined in some way for calculating the spring constant. However, it is not easy for a person skilled in the art to appropriately determine such theoretical commanded position.

According to the invention disclosed in Japanese Patent Application Laid-open No. 2011-125956, an operation to attach the weight to the tip end of the robot arm unit needs to be performed to calculate the spring constant. Thus, it is hard work for an operator to attach the weight.

SUMMARY OF INVENTION

The present invention is directed to the provision of a deflection measurement system which is low in cost and capable of calculating the above-described spring constant by an easy operation for an operator.

According to a first aspect of the present invention, a deflection measurement system for measuring deflection of a mechanism unit of an articulated robot is provided which includes:

a measured mark arranged on one of an arbitrary mechanism unit of the articulated robot and a position distant from the articulated robot;

a position measuring device arranged on the other of the arbitrary mechanism unit of the articulated robot and the position distant from the articulated robot and configured to measure a position of the measured mark; and a control apparatus configured to respectively control the articulated robot and the position measuring device, wherein the control apparatus includes:

a robot control unit configured to change posture of the articulated robot so that a relative positional relationship between the measured mark and the position measuring device is changed only depending on deflection of the mechanism unit; and a deflection amount calculation unit configured to measure positions of the measured mark respectively before and after a change of the posture by the position measuring device and calculate an actual deflection amount of the mechanism unit based on a movement amount between the position of the measured mark measured before the change of the posture and the position of the measured mark measured after the change of the posture.

According to a second aspect of the present invention, a deflection measurement system for measuring deflection of a mechanism unit of an articulated robot is provided which includes:

two measured marks respectively arranged on two different links of the articulated robot;

a position measuring device arranged on a position distant from the articulated robot to face both of the two measured marks and configured to measure positions of both of the two measured marks; and a control apparatus configured to respectively control the articulated robot and the position measuring device, wherein the control apparatus includes:

a robot control unit configured to change posture of the articulated robot so that a relative positional relationship between the two measured marks is changed only depending on deflection of a joint axis connecting the two links; and a deflection amount calculation unit configured to measure positions of both of the two measured marks respectively before and after a change of the posture by the position measuring device, and calculate an actual deflection amount of the joint axis based on a difference between a movement amount between the position of one measured mark of the two measured marks measured before the change of the posture and the position of the one measured mark measured after the change of the posture and a movement amount between the position of the other measured mark of the two measured marks measured before the change of the posture and the position of the other measured mark measured after the change of the posture.

According to a third aspect of the present invention, the deflection measurement system according to the first aspect or the second aspect is provided in which the control apparatus further includes a spring constant calculation unit configured to obtain torque acting on the mechanism unit or the joint axis respectively before and after the change of the posture, calculate a variation between the torque obtained before the change of the posture and the torque obtained after the change of the posture, and calculate a spring constant of the mechanism unit when the mechanism unit is regarded as a rotational spring, on the basis of the calculated actual deflection amount, the variation in the torque, and a spatial position of the measured mark.

According to a fourth aspect of the present invention, the deflection measurement system according to any one of the first aspect to the third aspect is provided in which the measured mark is a luminescent material.

According to a fifth aspect of the present invention, the deflection measurement system according to any one of the first aspect to the fourth aspect is provided in which the position measuring device is a charge coupled device (CCD) camera.

According to a sixth aspect of the present invention, the deflection measurement system according to any one of the first aspect to the fourth aspect is provided in which the position measuring device is a position sensitive detector (PSD).

BRIEF DESCRIPTION OF THE DRAWINGS

These objects, features, and advantages of the present invention, and other objects, features, and advantages thereof will become apparent from the following detail description of exemplary embodiments with reference to the attached drawings.

DETAILED DESCRIPTION

Figure 1:
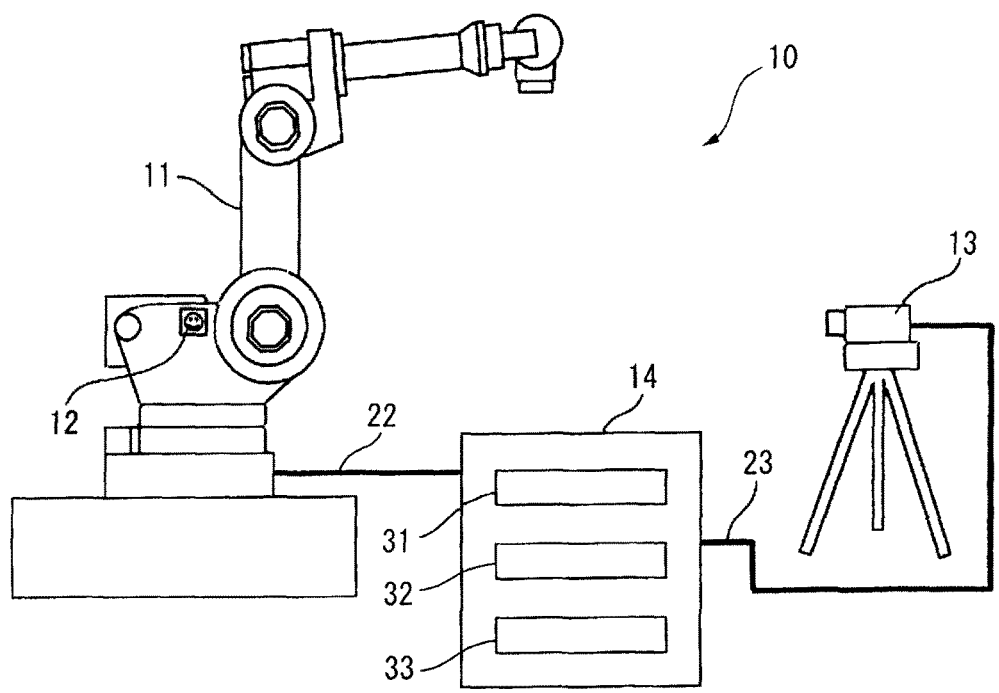
FIG. 1 illustrates an overall configuration of a deflection measurement system of a first embodiment.

Next, embodiments of the present invention are described with reference to the attached drawings. In the following drawings, the same members are denoted by the same reference numerals. The members denoted by the same reference numerals in the different drawings mean components having the same functions. Scales of the drawings have been appropriately changed to facilitate understanding of the present invention. In addition, the present invention is not limited to the embodiments illustrated in the drawings.

First, an overview of the present invention is described.

In an articulated robot, weight of a tool attached to a tip end of a robot arm unit acts on each joint axis and a link between the joint axes, and the joint axes and the link may be deflected. When the joint axis and the link are deflected as described above, for example, if a tool attached to the tip end of the robot arm unit is tried to be positioned based on a target position of the tool, an actual position of the positioned tool is shifted from the target position. Thus, when positioning control is performed on the tool attached to the tip end of the robot arm unit, it is necessary that a deflection amount of the joint axis and the link is estimated, and that the target position of the tool is corrected based on the estimated value of the deflection amount.

When the deflection amount of the above-described joint axis and the link is estimated in the positioning control of the tool, the joint axis or the link is conventionally regarded as a rotational spring to calculate a spring constant of the rotational spring. When the spring constant of the rotational spring is determined, a deflection amount (deflection angle) of the rotational spring can be calculated by dividing a value of load torque acting on the rotational spring about the rotation axis of the spring by a value of the spring constant. In other words, the deflection amount (deflection angle) about the rotation axis of the joint axis or the link when predetermined load torque acts on the joint axis or the link about the rotation axis thereof regarded as the rotational spring can be estimated. When the above-described spring constant can be more accurately determined, the deflection amount (deflection angle) about the rotation axis of the joint axis or the link can be also estimated more accurately, and thus positioning accuracy of the tool on the tip end of the above-described robot arm unit can be improved.

Thus, in the present application, the invention is proposed which can accurately calculate the spring constant necessary for estimation of the deflection amount of the joint axis or the link in positioning control of the above-described robot arm unit. Especially, in the present application, the invention is proposed which measures, by a position measuring device, a deflection amount actually generated on the joint axis or the link when the positioning control is performed on the robot arm unit and accurately calculates the above-described spring constant based on the deflection amount actually measured (hereinafter referred to as an actual deflection amount).

Thus, according to each embodiment described below, the deflection measurement system capable of measuring an actual deflection amount of the joint axis or the link in the articulated robot is presented. According to each embodiment described below, the deflection measurement system capable of determining the spring constant of the joint axis or the link by using the actual deflection amount of the joint axis or the link is also presented.

First Embodiment

FIG. 1 illustrates an overall configuration of a deflection measurement system of a first embodiment.

As illustrated in FIG. 1, a deflection measurement system 10 of the first embodiment includes a measured mark 12 attached to a predetermined mechanism unit of a robot 11, a camera 13 as a position measuring device for measuring a position of the measured mark 12, and a control apparatus 14 for respectively controlling the robot 11 and the camera 13.

The control apparatus 14 includes a robot control unit 31, a deflection amount calculation unit 32, and a spring constant calculation unit 33. The robot control unit 31 changes posture of the robot 11 so that a relative positional relationship between the measured mark 12 and the camera 13 is changed only depending on deflection of the above-described mechanism unit. The deflection amount calculation unit 32 measures positions of the measured mark 12 respectively before and after a change of the posture of the robot 11 by the camera 13 and calculates an actual deflection amount of the above-described mechanism unit based on a movement amount between the position of the measured mark 12 measured before the change of the posture of the robot 11 and the position of the measured mark 12 measured after the change of the posture of the robot 11. The spring constant calculation unit 33 obtains each torque acting on the above-described mechanism unit before and after the change of the posture of the above-described robot 11, calculates a variation in the obtained torque, and calculates a spring constant of the mechanism unit when the above-described mechanism unit is regarded as a rotational spring based on the calculated actual deflection amount, the variation in the torque, and the spatial position of the measured mark 12.

The robot 11 illustrated in FIG. 1 is a typical vertical articulated robot. The robot 11 and the control apparatus 14 are connected with each other via a cable 22. The camera 13 and the control apparatus 14 are connected with each other via a cable 23.

The measured mark 12 is used for measuring a deflection amount of a predetermined mechanism unit, for example, a link or a joint axis of the robot 11. According to the present embodiment, the measured mark 12 is attached to a link between a first joint axis and a second joint axis of the robot 11 (see a reference numeral 11$b$1 in FIG. 3).

The camera 13 is installed and fixed to a position distant from the robot 11. Further, the camera 13 is installed and fixed to face the measured mark 12 on the robot 11 so that an entire image of the measured mark 12 is displayed in an image captured by the camera 13. For example, a tripod is used to install the camera 13. Further, the camera 13 is installed outside of an operation range of the robot 11 so that the position of the camera 13 is not changed no matter how the robot 11 operates.

Figure 2:
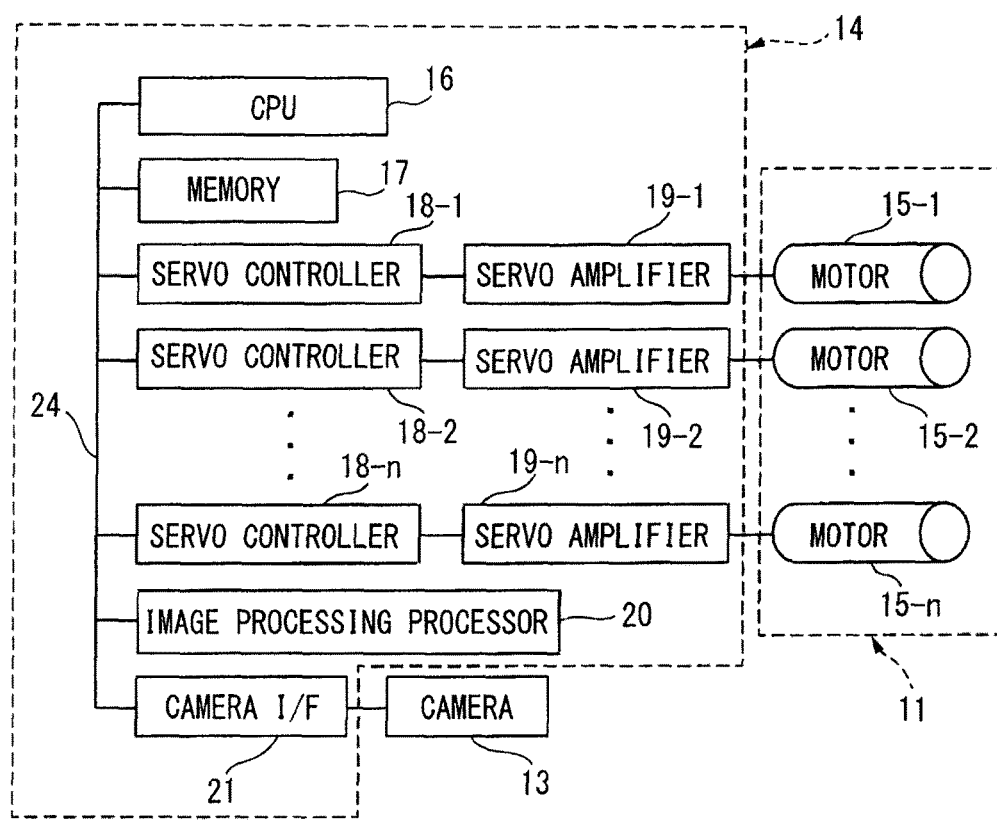
FIG. 2 is a block diagram illustrating control components in the deflection measurement system of the first embodiment.

FIG. 2 is a block diagram illustrating control components in the deflection measurement system 10.

The above-described robot 11 includes a robot arm unit constituted of n joint axes and (n−1) links connecting between each of the joint axes. Further, as illustrated in FIG. 2, n motors 15-1 to 15-$n$ are disposed on each of the n joint axes. The number "n" is a natural number, and according to the present embodiment, n is six. Each link is also referred to as an arm unit.

As illustrated in FIG. 2, the control apparatus 14 includes a central processing unit (CPU) 16, a memory 17 including a random access memory (RAM), a read-only memory (ROM), a nonvolatile memory, and the like, n servo controllers 18-1 to 18-$n$, n servo amplifiers 19-1 to 19-$n$, an image processing processor 20, and a camera interface (camera I/F) 21. The components are connected with each other via a bus 24. The CPU 16 illustrated in FIG. 2 corresponds to the robot control unit 31, the deflection amount calculation unit 32, and the spring constant calculation unit 33 described above.

The ROM of the above-described memory 17 stores a system program for supporting basic functions of the robot 11 and the control apparatus 14. The ROM also stores an image processing program for detecting the measured mark 12 from an image of the robot 11 captured by the camera 13 and a program for calculating, by the known Newton-Euler method, load torque acting on each joint axis of the robot 11.

The nonvolatile memory of the above-described memory 17 stores an operation program of the robot 11 and parameters, for example, dimensions of the measured mark 12, used when a deflection amount of the robot 11 is calculated, which is described below.

The RAM of the above-described memory 17 is used as a storage area for temporarily storing video signal data for generating an image of the robot 11 captured by the camera 13, data in various types of arithmetic processing executed by the CPU 16, and the like.

The servo controllers 18-1 to 18-$n$ receive a movement command generated by the CPU 16 via the arithmetic processing for controlling the robot 11, for example, calculation of torque acting on each joint axis of the robot 11 and inverse transformation calculation. The servo controllers 18-1 to 18-$n$ respectively output torque commands to the servo amplifiers 19-1 to 19-$n$ while comparing the received movement command with a feedback signal received from a pulse coder (not illustrated) attached to each joint axis of the robot 11. The servo amplifiers 19-1 to 19-$n$ respectively supply an electric current to the motors 15-1 to 15-$n$ of the respective joint axes based on the respective torque commands and drive the respective motors 15-1 to 15-$n$.

The camera 13 illustrated in FIG. 2 is, for example, a CCD camera and connected to the camera interface 21 in the control apparatus 14. The CCD camera has a function of detecting an object to be imaged as a two-dimensional image by a light receiving device surface, for example, a CCD array surface.

In the control apparatus 14 illustrated in FIG. 2, when the CPU 16 transmits an imaging command to the camera 13 via the camera interface 21, imaging is executed by an electronic shutter function set in the camera 13. A video signal, i.e. an image captured by the camera 13 is stored in the RAM of the memory 17 via the camera interface 21. The video signal stored in the RAM is analyzed using the image processing processor 20. Further, a position and dimensions of the measured mark 12 on the image captured by the camera 13 are calculated by the image processing program in the RAM.

Figure 3:
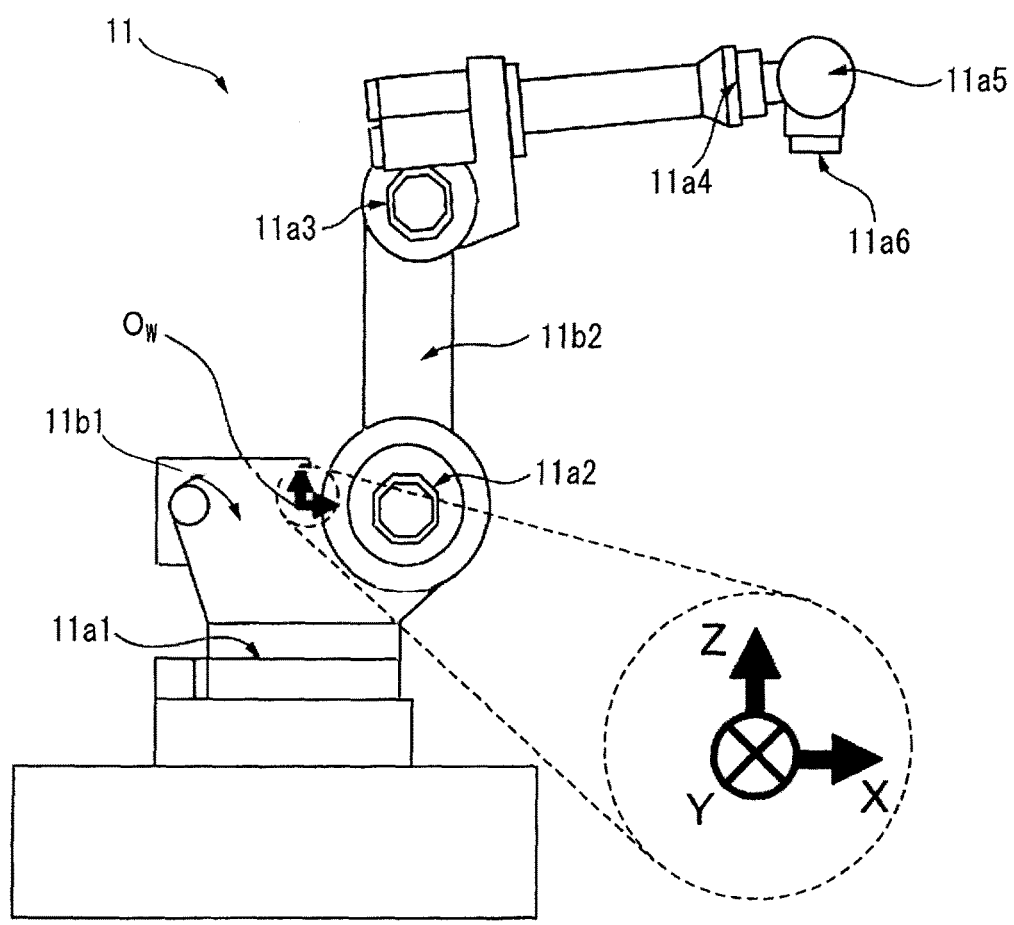
FIG. 3 illustrates a structure of a robot illustrated in FIG. 1 in more detail.
Figure 4:
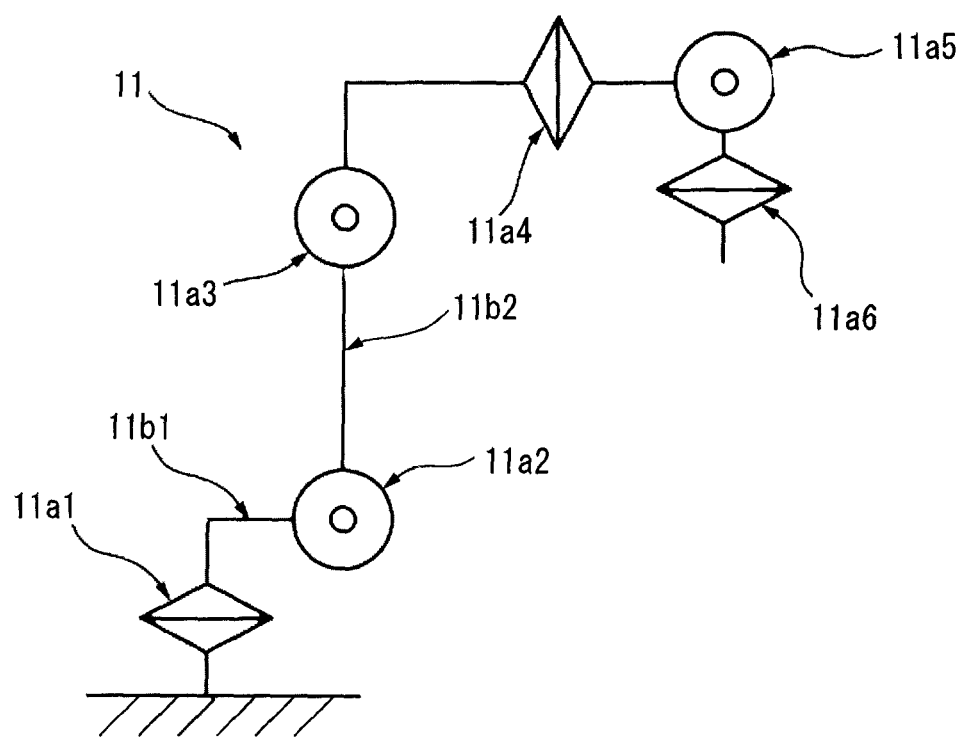
FIG. 4 illustrates each modeled joint axis and each modeled arm unit constituting the robot illustrated in FIG. 3 in models.

FIG. 3 illustrates a structure of the robot 11 illustrated in FIG. 1 in more detail. FIG. 4 illustrates each modeled joint axis and each modeled link of the robot 11 illustrated in FIG. 3 and a position and a rotation direction of each joint axis.

The robot 11 of the present embodiment includes a first joint axis 11a1, a second joint axis 11a2, a third joint axis 11a3, a fourth joint axis 11a4, a fifth joint axis 11a5, and a sixth joint axis 11a6 as illustrated in FIG. 3 and FIG. 4. There is a link between each of the joint axes. Each of the joint axes 11a1 to 11a6 is a robot site connecting two adjacent links with each other, and the two adjacent links can relatively rotate about the joint axis between the links.

As can be seen from FIG. 3 and FIG. 4, each of the second joint axis 11a2, the third joint axis 11a3, and the fifth joint axis 11a5 is an axis unit on which load torque acts around the joint axis. A link 11b1 between the first joint axis 11a1 and the second joint axis 11a2 can be also regarded as a robot site having an upper end of the first joint axis 11a1 placed in a vertical direction as a rotation fulcrum on which load torque acts.

According the first embodiment, it is assumed that the link 11b1 is deflected by the action of the load torque, and the above-described deflection measurement system 10 measures an actual deflection amount of the link 11b1. Therefore, the measured mark 12 is attached to the link 11b1.

Further, as illustrated in FIG. 3, a world coordinate system (an XYZ coordinate system) satisfying the following conditions 1) to 3) is provided on the link 11b1 in a real space, and the actual deflection amount of the link 11b1 is measured using the world coordinate system.

1) The Z axis matches with a rotation axis of the first joint axis 11a1.
2) The Y axis is parallel to a rotation axis of the second joint axis 11a2.
3) The rotation axis of the second joint axis 11a2 is on the XY plane.

A sign $O_w$ in FIG. 3 is an origin of the world coordinate system defined on the link 11b1. Directions of the X, Y, and Z axes based on the origin $O_w$ is illustrated in an enlarged view in FIG. 3. In the world coordinate system illustrated in FIG. 3, a +X axis, a +Z axis, and a +Y axis are respectively defined in a right direction, an upper direction, and a depth direction of FIG. 3.

Every term "world coordinate system" described in each of the following embodiments represents the XYZ coordinate system defined on the robot 11 as described above.

Next, operations of the deflection measurement system 10 of the first embodiment are described. Hereinafter, a case is described as an example in which the actual deflection amount of the link 11b1 on the XZ plane illustrated in FIG. 3 is measured.

Figure 5:
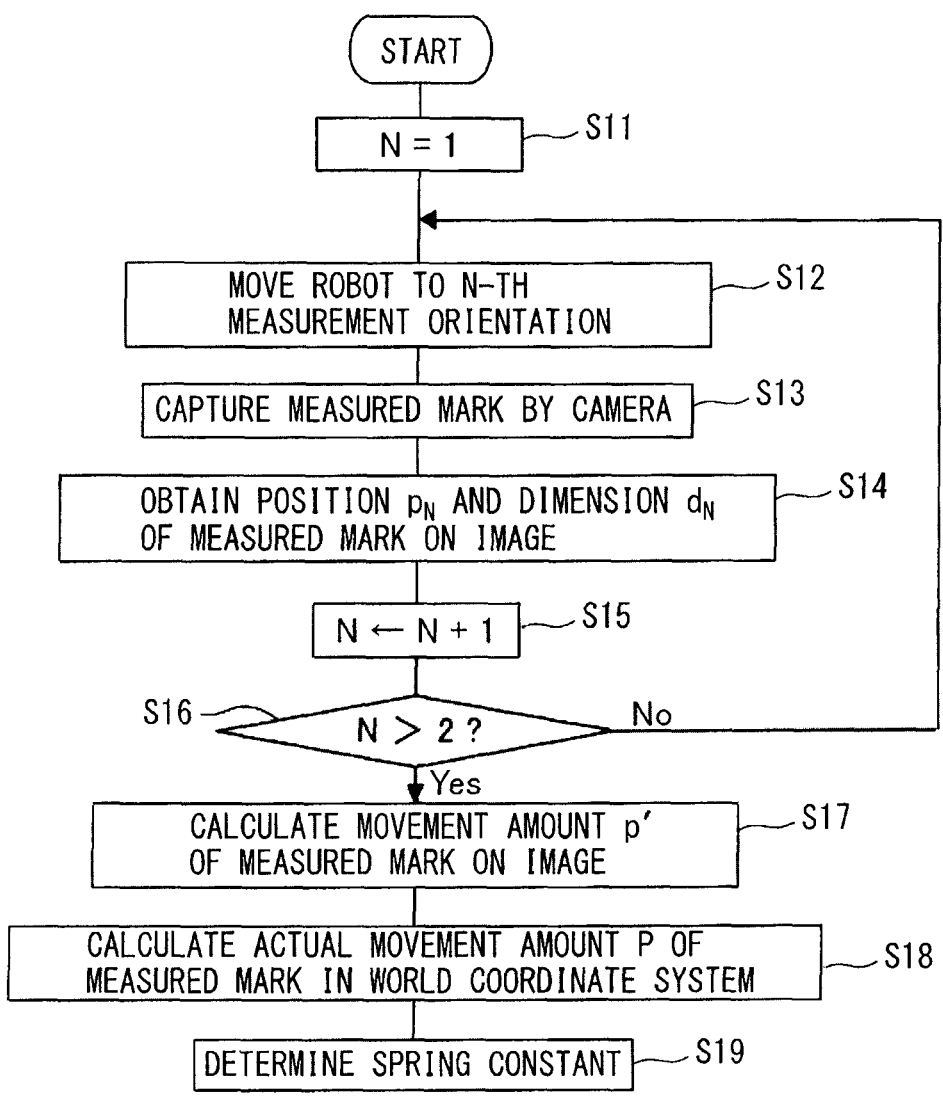
FIG. 5 is a flowchart illustrating a processing flow for measuring deflection of a robot by the deflection measurement system of the first embodiment.

FIG. 5 is a flowchart illustrating a processing flow for measuring deflection of the robot 11 by the deflection measurement system 10 of the first embodiment.

When the deflection measurement of the robot 11 is started, first, as illustrated in step S11 in FIG. 5, the control apparatus 14 sets a value N of a counter (not illustrated) for counting an order of a measurement posture of the robot 11 to one. Further, the robot control unit 31 of the control apparatus 14 moves the robot 11 so that the robot 11 takes an N-th (i.e., N←1) measurement posture (step S12 in FIG. 5).

Figure 6:
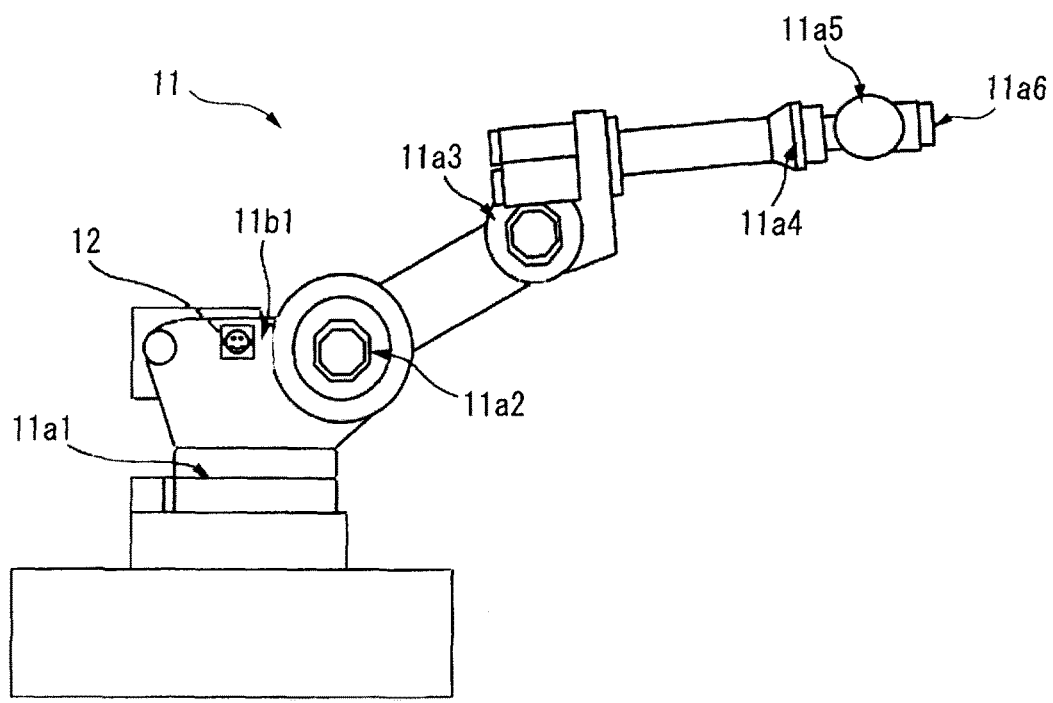
FIG. 6 illustrates a first measurement posture of the robot illustrated in FIG. 1.
Figure 7:
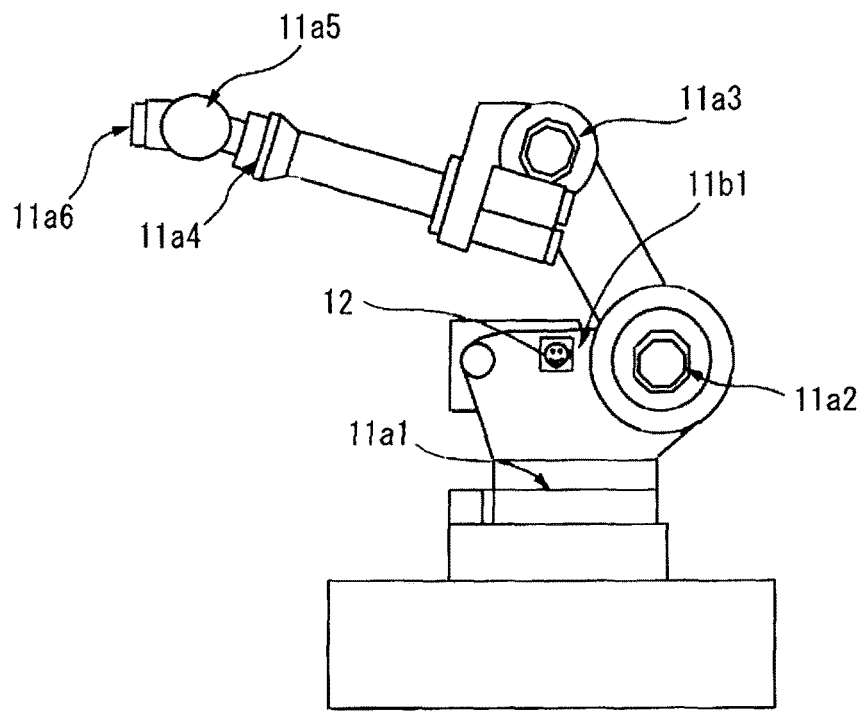
FIG. 7 illustrates a second measurement posture of the robot illustrated in FIG. 1.

FIG. 6 illustrates a first measurement posture of the robot 11, and FIG. 7 illustrates a second measurement posture of the robot 11.

According to the first embodiment, a value of a commanded angle of rotation supplied to the motor of the first joint axis 11a1 is set to the same value in the case of the first measurement posture of the robot 11 illustrated in FIG. 6 and in the case of the second measurement posture of the robot 11 illustrated in FIG. 7. In other words, when the posture of the robot 11 is changed from the first measurement posture illustrated in FIG. 6 to the second measurement posture illustrated in FIG. 7, the first joint axis 11a1 is prevented from being rotated about the axis. Accordingly, a relative positional relationship between the measured mark 12 attached to the link 11b1 of the robot 11 and the camera 13 (see FIG. 1) installed to face the measured mark 12 on the robot 11 is changed by only an influence of the deflection of the link 11b1 of the robot 11.

Referring to FIG. 5 again, after the above-described step S12, the control apparatus 14 captures an image of the measured mark 12 by the camera 13 when the posture of the robot 11 is the above-described first measurement posture (step S13 in FIG. 5). As can be seen from FIG. 6 and FIG. 7, the measured mark 12 of the present embodiment is a circular pattern.

Further, the control apparatus 14 performs image processing on the image captured by the camera 13 and obtains a position $p_N$ and a dimension $d_N$ of the measured mark 12 on the image (step S14 in FIG. 5). Subsequently, the above-described value N is incremented by one (step S15 in FIG. 5). Then, the control apparatus 14 determines whether the value N is larger than two (step S16 in FIG. 5), and if the value N is not larger than two, the above-described step S12 to step S15 are repeated.

Accordingly, a position $p_1$ and a dimension $d_1$ of the measured mark 12 on the camera image when the robot 11 is in the first measurement posture illustrated in FIG. 6 and a position $p_2$ and a dimension $d_2$ of the measured mark 12 on the camera image when the robot 11 is in the second measurement posture illustrated in FIG. 7 are obtained. When the value N is larger than two in the above-described step S16, the control apparatus 14 terminates the measurement of the measured mark 12 by the camera 13. Subsequently, the control apparatus 14 calculates a movement amount p' of the measured mark 12 on the camera image from the positions $p_1$ and $p_2$ of the obtained measured mark 12 (step S17 in FIG. 5).

After the step S17, the control apparatus 14 calculates an actual movement amount P of the measured mark 12 in the world coordinate system from the movement amount p' and the dimensions $d_1$ and $d_2$ of the measured mark 12 on the above-described camera image (step S18 in FIG. 5).

The step S17 and step S18 are more specifically described.

Figure 8:
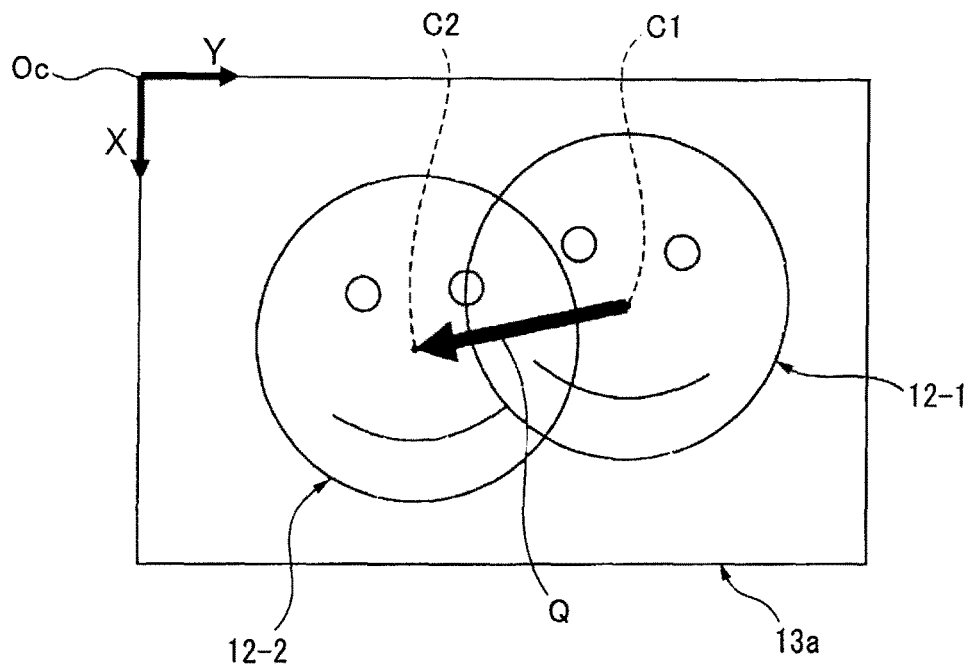
FIG. 8 illustrates an image obtained by overlapping an image captured by a camera when the robot is in the first measurement posture illustrated in FIG. 6 and an image captured by the camera when the robot is in the second measurement posture illustrated in FIG. 7.

FIG. 8 illustrates an image obtained by overlapping the image captured by the camera 13 when the robot 11 is in the first measurement posture illustrated in FIG. 6 and the image captured by the camera 13 when the robot 11 is in the second measurement posture illustrated in FIG. 7.

In FIG. 8, the measured mark 12 captured when the robot 11 is in the first measurement posture is indicated as a measured mark 12-1, and the measured mark 12 captured when the robot 11 is in the second measurement posture is indicated as a measured mark 12-2. In FIG. 8, a length of an arrow Q from the center C1 of the measured mark 12-1 toward the center C2 of the measured mark 12-2 is the movement amount p' between the measured mark 12-1 and the measured mark 12-2 on an image 13a. The image 13a captured by the camera 13 of the present embodiment is a rectangular image as illustrated in FIG. 8.

When the movement amount p' of the measured mark 12 is calculated in the above-described step S17, first, the control apparatus 14 respectively obtains the position $p_1$ of the above-described measured mark 12-1 and the position $p_2$ of the above-described measured mark 12-2 from the image 13a illustrated in FIG. 8. At that time, coordinate values of the center C1 of the measured mark 12-1 are obtained as the position $p_1$ of the measured mark 12-1, and coordinate values of the center C2 of the measured mark 12-2 are obtained as the position $p_2$ of the measured mark 12-2.

The coordinate values on the rectangular image 13a illustrated in FIG. 8 are obtained by a two-dimensional coordinate system which defines the origin $O_c$ at an upper left corner of the image 13a, the +Y axis from the origin $O_c$ to a right direction of FIG. 8, and the +X axis from the origin $O_c$ to a lower direction of FIG. 8. Thus, the coordinate values of the center C1 of the above-described measured mark 12-1 are expressed as $(x_1, y_1)$, and the coordinate values of the center C2 of the above-described measured mark 12-2 are expressed as $(x_2, y_2)$. The coordinate values have coordinate values (unit: pixel) of pixels constituting the image 13a.

The control apparatus 14 subtracts the coordinate values $(x_1, y_1)$ of the center C1 of the measured mark 12-1 on the image 13a from the coordinate values $(x_2, y_2)$ of the center C2 of the measured mark 12-2 on the image 13a to calculate the movement amount $p'(=(p_x, p_y))$ of the measured mark 12 on the image 13a. The value $p_x$ is the movement amount in the X direction of the coordinate system of the image 13a and is obtained by subtracting $x_1$ from $x_2$. The value $p_y$ is the movement amount in the Y direction of the coordinate system of the image 13a and is obtained by subtracting $y_1$ from $y_2$.

Subsequently, the above-described step S18, i.e. processing for calculating the actual movement amount P of the measured mark 12 in the world coordinate system is described.

The actual movement amount P of the measured mark 12 is expressed using coordinate values $(P_x, P_y, P_z)$ of the world coordinate system. The control apparatus 14 can convert the coordinate values $(p_x, p_y)$ expressing the movement amount p' of the measured mark 12 on the image 13a into the coordinate values $(P_x, P_y, P_z)$ of the above-described world coordinate system using a following formula (1).

[Formula 1]

$$\begin{bmatrix} P_x \\ P_y \\ P_z \end{bmatrix} = \begin{bmatrix} P_y \\ 0 \\ -p_x \end{bmatrix} \times 2D/(d_1 + d_2) \quad (1)$$

In the above-described formula (1), "$2D/(d_1+d_2)$" is magnification between the dimension D of the measured mark 12 in the world coordinate system and an average value of the dimension $d_1$ of the measured mark 12-1 and the dimension $d_2$ of the measured mark 12-2 on the image 13a.

According to the present embodiment, each of the dimensions D, $d_1$, and $d_2$ is a diameter (unit: mm) of the measured mark 12 regarded as a circle. The values of the dimension $d_1$ and the dimension $d_2$ are obtained from the above-described step S12 to step S15 in FIG. 5. The value of the dimension D is obtained and stored in the memory 17 of the control apparatus 14 in advance by an operator.

As can be seen from the above-described formula (1), the actual movement amount P of the measured mark 12 is calculated by regarding the +Y axis and the +X axis of the coordinate system of the image 13a illustrated in FIG. 8 respectively as corresponding to the +X axis and the −Z axis of the world coordinate system illustrated in FIG. 3. The values of $P_x$, $P_y$, and $P_x$ calculated by the above-described formula (1) express the actual movement amount P of the measured mark 12 when the measurement posture of the robot 11 illustrated in FIG. 6 is changed to the measurement posture of the robot 11 illustrated in FIG. 7.

According to the present embodiment, the movement amount p' of the measured mark 12 on the two-dimensional camera image is converted into the coordinate values in the world coordinate system, and thus the value $P_y$ calculated by the above-described formula (1) is zero. Therefore, when the above-described actual movement amount P is calculated, the actual movement amount P can be calculated by a following formula (2) using the values $P_x$ and $P_z$ calculated by the above-described formula (1). The above-described calculation is performed by the deflection amount calculation unit 32 in the control apparatus 14.

[Formula 2]

$$P = \sqrt{P_x^2 + P_z^2} \quad (2)$$

In order to accurately obtain the actual movement amount P of the above-described measured mark 12, the movement amount p' of the measured mark 12 on the camera image must be accurately measured. Thus, according to the first embodiment, it is preferable that the camera 13 is installed so as to display both of the measured mark 12-1 and the measured mark 12-2 as large as possible in the image 13a illustrated in FIG. 8.

As described above, the deflection measurement system 10 of the first embodiment calculates the actual movement amount P of the measured mark 12 in the world coordinate system using the above-described formulae (1) and (2). According to the first embodiment, the calculated actual movement amount P corresponds to the actual deflection amount of the link 11b1 on the XZ plane of the world coordinate system illustrated in FIG. 3.

Subsequently, referring to FIG. 5 again, after the above-described step S18, the control apparatus 14 determines a spring constant of the link 11b1 using the actual movement amount P of the measured mark 12 by the above-described formula (1), a variation in torque described below, the coordinate values of the measured mark 12 in the world coordinate system, and the like (step S19 in FIG. 5).

Contents of the step S19 (determination processing of the spring constant) are described in detail below.

According to the first embodiment, as described above, the link 11b1 is regarded as a rotational spring, and a spring constant of the rotational spring is determined in advance so as to perform the positioning control on the tool on the tip end of the robot 11 in consideration of the deflection amount of the link 11b1. When the spring constant of the rotational spring is determined, the deflection amount (deflection angle) of the link 11b1 as the rotational spring can be estimated by dividing a value of the load torque acting on the rotational spring about the rotation axis of the spring by a value of the spring constant. When the above-described spring constant can be more accurately determined, the deflection amount (deflection angle) of the link 11b1 can be also more accurately estimated. When the above-described positioning control of the tool is performed, the target position of the tool is corrected based on the accurately estimated deflection amount of the link 11b1, and accordingly, the positioning accuracy of the tool on the tip end of the above-described robot can be improved.

Thus, the deflection measurement system 10 of the present embodiment can perform the processing for determining the spring constant of the link 11b1 by the spring constant calculation unit 33 in the control apparatus 14.

According to the first embodiment, the rotation axis of the link 11b1 regarded as the rotational spring matches with the Y axis of the world coordinate system (see FIG. 3). In other words, according to the first embodiment, the spring constant for estimating the deflection amount of the link 11b1 about the Y axis in the above-described world coordinate system is determined.

Thus, first, a rotational movement amount (rotation angle) of the link 11b1 about the Y axis is estimated when the link 11b1 is deflected about the Y axis by the load torque about the Y axis of the world coordinate system. The rotational movement amount can be calculated by dividing the variation in the load torque about the Y axis of the world coordinate system acting on the link 11b1 by the spring constant of the link 11b1 as expressed in a following formula (3).

$$M=(T2-T1)/k_1 \qquad (3)$$

In the above-described formula (3), M is an estimated value of the rotational movement amount of the link 11b1. The constant $k_1$ is the spring constant of the link 11b1 to be calculated.

The expression (T2−T1) is a variation in the load torque about the Y axis of the world coordinate system acting on the link 11b1. Specifically, (T2−T1) is a value obtained by subtracting load torque T1 about the Y axis of the world coordinate system acting on the link 11b1 when the robot 11 is in the measurement posture illustrated in FIG. 6 from load torque T2 about the Y axis of the world coordinate system acting on the link 11b1 when the robot 11 is in the measurement posture illustrated in FIG. 7.

Further, the values of the above-described load torques T1 and T2 are stored in the control apparatus 14 in advance. For example, when the robot 11 is in the measurement posture illustrated in FIG. 6 and in the measurement posture illustrated in FIG. 7, the control apparatus 14 calculates, by the known Newton-Euler method, components of the load torque about the Y axis of the world coordinate system acting on the first joint axis 11a1 of the robot 11 and stores, in the memory 17 of the control apparatus 14, respective values as the load torques T1 and T2 about the Y axis of the world coordinate system. The value of the spring constant $k_1$ is not yet determined thus far. Thus, the rotational movement amount M estimated from the above-described formula (3) is a variable including the undetermined spring constant $k_1$.

Subsequently, a movement amount P' of the measured mark 12 about the Y axis is estimated when the link 11b1 is deflected about the Y axis due to the load torque about the Y axis of the world coordinate system acting on the link 11b1. Hereinafter, the estimated movement amount P' of the measured mark 12 is referred to as an estimated movement amount P' of the measured mark 12.

The estimated movement amount P' of the measured mark 12 about the Y axis can be calculated by a following formula (4). In other words, the above-described rotational movement amount M (rotation angle) is regarded as minute, and a length of a circular arc having the rotational movement amount as a center angle is regarded as the estimated movement amount P'.

$$P'=r\times M \qquad (4)$$

In the above-described formula (4), "r" is a distance from the origin $O_w$ of the world coordinate system illustrated in FIG. 3 to a center position of the measured mark 12 on the robot 11.

Regarding a value of the above-described distance r, an operator actually measures the distance r from the origin $O_w$ of the world coordinate system illustrated in FIG. 3 to the center position of the measured mark 12 on the robot 11 and stores the distance r in the memory 17 of the control apparatus 14 in advance. The posture of the robot 11 when the distance r is actually measured may be the first measurement posture or the second measurement posture of the above-described robot 11.

The above-described formula (4) for calculating the above-described estimated movement amount P' may be replaced, by using the above-described formula (3), with a following formula (5) including the undetermined spring constant $k_1$.

$$P'=r\times((T2-T1)/k_1) \qquad (5)$$

In the above-described formula (5), the values r, T1, and T2 other than the spring constant $k_1$ are stored in the memory 17 of the control apparatus 14 as described above.

According to the first embodiment, the value of the spring constant $k_1$ of the link 11b1 is determined so that a result of an expression on the right-hand side of the above-described formula (5) is equal to a value of the actual movement amount P calculated by the above-described formula (2). In other words, the value of the spring constant $k_1$ is determined so that a difference between the above-described estimated movement amount P' and the actual movement amount P is zero. Accordingly, the spring constant $k_1$ of the link 11b1 will be an accurate value conforming to the actual deflection amount of the link 11b1.

Further, according to the first embodiment, the rotational movement amount of the link 11b1 about the Y axis, i.e. the deflection amount when predetermined load torque acts on the robot 11 about the Y axis in the world coordinate system can be estimated using the above-described formula (3). In this regard, the value of the spring constant $k_1$ calculated as described above is determined in advance in the above-described formula (3), and accordingly, the estimated value of the deflection amount can be obtained as an accurate value conforming to the actual deflection amount of the link 11b1. Therefore, when the positioning control is performed on the tool on the tip end of the robot 11 as described above, the target position of the tool can be accurately corrected based on such estimated value of the deflection amount.

The CPU 16 of the control apparatus 14 of the first embodiment includes the spring constant calculation unit 33 for calculating the spring constant $k_1$ of the link 11b1 as described above. It is preferable that the CPU 16 is to store, in the memory 17, the spring constant $k_1$ of the link 11b1 calculated by the spring constant calculation unit 33 and to read the spring constant $k_1$ from the memory 17 when controlling the robot 11.

Further, according to the above-described first embodiment, the deflection amount of the link 11b1 about the Y axis in the world coordinate system is actually measured, and the spring constant of the link 11b1 about the Y axis is determined based on the actual deflection amount. However, the present invention is not limited to the configuration which calculates the actual deflection amount and the spring constant of the link 11b1 about the Y axis in the world coordinate system. In other words, according to the present invention, the actual deflection amount and the spring constant of the link 11b1 about the X axis or the Z axis in the world coordinate system of the robot 11 may be calculated by changing an attachment position of the measured mark 12 on the robot 11 of the first embodiment to a different position. Needless to say, a measurement target of the actual deflection amount and a calculation target of the spring constant may be a link other than the link 11b1 of the robot 11.

According the above-described first embodiment, the number of the measured mark 12 to be attached to the robot 11 is not limited to one. According to the present invention, it is preferable that at least one measured mark 12 is attached to the robot 11 so as to accurately determine the value of the spring constant $k_1$. Regarding the number of the camera 13, at least one camera 13 only has to be included.

According to the above-described first embodiment, the measured mark 12 is attached to the robot 11, and the camera 13 is fixed to the position distant from the robot 11, however, the present invention is not limited to this aspect. In other words, according to the present invention, the camera 13 may be attached to the robot 11, and the measured mark 12 may be fixed to a position distant from the robot 11.

The measured mark 12 of the first embodiment is a mark of a combination of printed lines, however, the present invention is not limited to such kind of mark. Further, according to the present invention, a luminescent material may be used as the measured mark 12. When the luminescent material is used as the measured mark 12, a PSD may be used as the position measuring device instead of the camera 13. In other words, similar to the deflection measurement in the above-described first embodiment, a movement amount of the luminescent material on the PSD is obtained when the posture of the robot 11 is changed, and the actual deflection amount of the robot 11 may be measured from the movement amount.

Second Embodiment

Next, a second embodiment of the present invention is described. Components same as those in the first embodiment are denoted by the same reference numerals, and description thereof will be omitted. Only points different from the components of the first embodiment are described below.

According to the second embodiment, an example is described in which the actual deflection amount and the spring constant about an axis of the second joint axis 11a2 in the world coordinate system illustrated in FIG. 3 are calculated.

Figure 9:
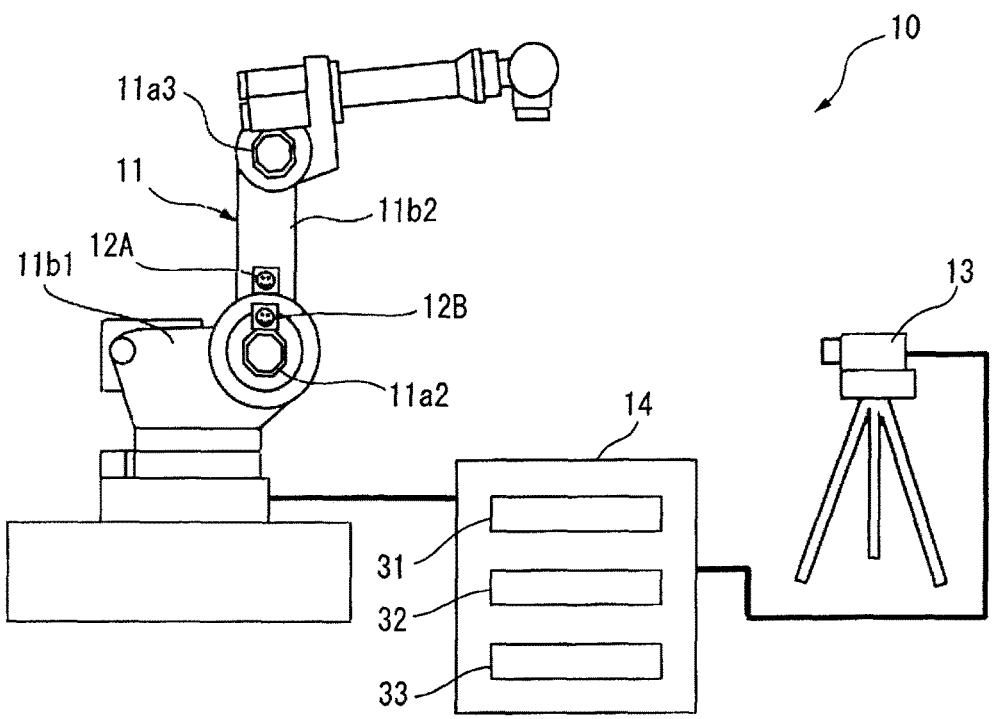
FIG. 9 illustrates an overall configuration of a deflection measurement system of a second embodiment.

FIG. 9 illustrates an overall configuration of the deflection measurement system of the second embodiment.

Two measured marks 12A and 12B are attached to the robot 11 to measure deflection about the axis of the above-described second joint axis 11a2. More specifically, as illustrated in FIG. 9, the one measured mark 12A is arranged on a link 11b2 between the second joint axis 11a2 and the third joint axis 11a3. The other measured mark 12B is arranged on the link 11b1 between the first joint axis 11a1 and the second joint axis 11a2. In this regard, as illustrated in FIG. 9, it is preferable that the measured mark 12B is arranged near the second joint axis 11a2 so that a distance between the two measured marks 12A and 12B becomes as short as possible.

The two measured marks 12A and 12B respectively have the same dimensions and the same pattern. The camera 13 is installed so as to be able to capture an image including entire images of both of the measured marks 12A and 12B.

The robot control unit 31 of the second embodiment changes the posture of the robot 11 so that the relative positional relationship of the two measured marks 12A and 12B is changed by only deflection of the second joint axis 11a2 connecting the two links 11b1 and 11b2. The deflection amount calculation unit 32 of the second embodiment measures, by the camera 13, respective positions of the two measured marks 12A and 12B before and after the change of the posture of the robot 11 and calculates an actual deflection amount of the second joint axis 11a2 based on a relative movement amount of the two measured marks 12A and 12B before and after the change of the posture of the robot 11. Further, the spring constant calculation unit 33 of the second embodiment obtains each torque acting on the second joint axis 11a2 before and after the change of the posture of the above-described robot 11, calculates a variation in the obtained torque, and calculates a spring constant of the second joint axis 11a2 when the above-described second joint axis 11a2 is regarded as a rotational spring based on the calculated actual deflection amount, the calculated variation in the torque, and the spatial position of the measured mark 12A.

The configuration other than the above-described points is the same as that of the above-described deflection measurement system 10 of the first embodiment. The world coordinate system defining a three-dimensional position of the robot 11 is defined in the same manner as that for the world coordinate system illustrated in FIG. 3. An image captured by the camera 13 and a xy coordinate system defined to the image are also the same as those of the image 13a captured by the camera 13 of the above-described first embodiment (see FIG. 8).

Next, operations of the deflection measurement system 10 of the second embodiment are described.

Figure 10:
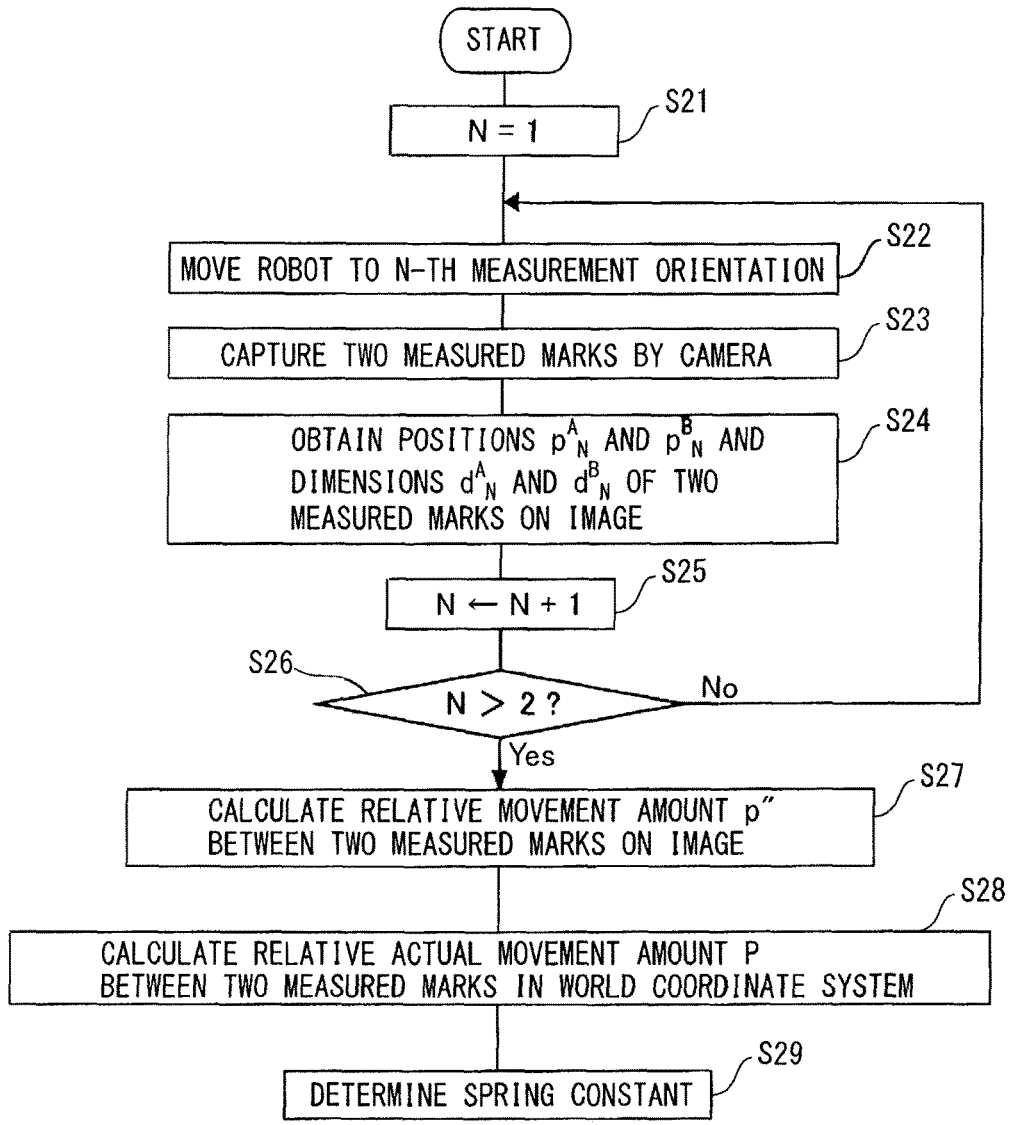
FIG. 10 is a flowchart illustrating a processing flow for measuring deflection of a robot by the deflection measurement system of the second embodiment.

FIG. 10 is a flowchart illustrating a processing flow for measuring deflection of the robot 11 by the deflection measurement system 10 of the second embodiment.

When the deflection measurement of the robot 11 is started, first, as illustrated in step S21 in FIG. 10, the control apparatus 14 sets a value N of a counter (not illustrated) for counting an order of a measurement posture of the robot 11 to one. Further, the robot control unit 31 of the control apparatus 14 moves the robot 11 so that the robot 11 takes an N-th (i.e., N←1) measurement posture (step S22 in FIG. 10).

Figure 11:
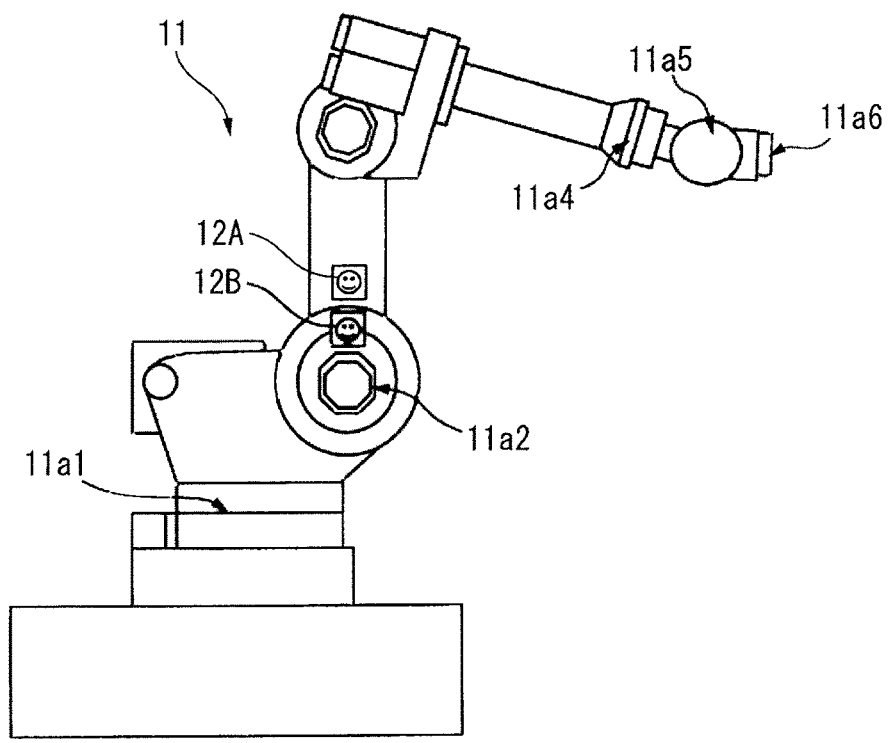
FIG. 11 illustrates a first measurement posture of a robot illustrated in FIG. 9.
Figure 12:
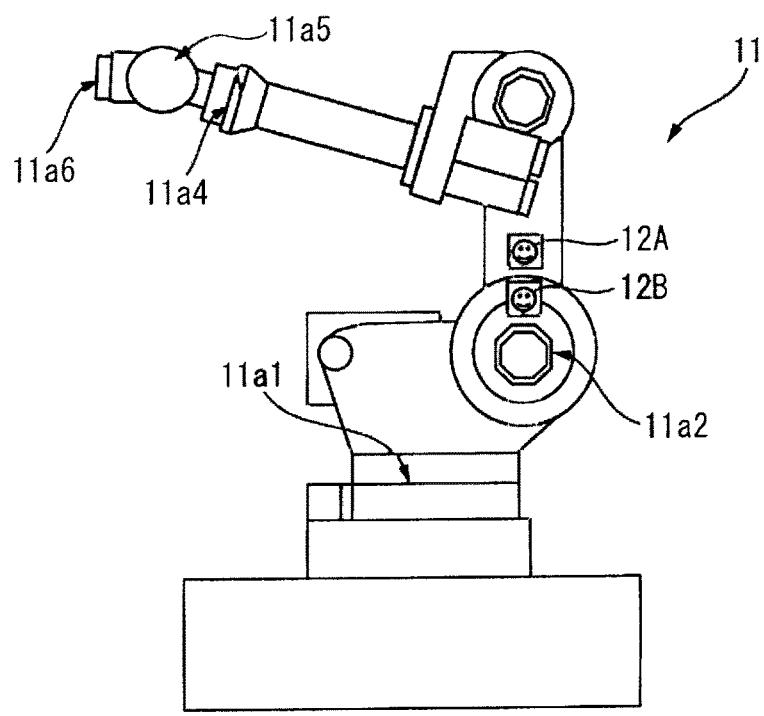
FIG. 12 illustrates a second measurement posture of the robot illustrated in FIG. 9.

FIG. 11 illustrates a first measurement posture of the robot illustrated in FIG. 9, and FIG. 12 illustrates a second measurement posture of the robot illustrated in FIG. 9.

According to the second embodiment, values of commanded angles of rotation supplied to respective motors (not illustrated) of the first joint axis 11a1 and the second joint axis 11a2 of the robot 11 are set to the same values in the case of the first measurement posture of the robot 11 illustrated in FIG. 11 and in the case of the second measurement posture of the robot 11 illustrated in FIG. 12. In other words, when the measurement posture of the robot 11 is changed from the first measurement posture illustrated in FIG. 11 to the second measurement posture illustrated in FIG. 12, the first joint axis 11a1 and the second joint axis 11a2 are respectively prevented from being rotated about the axes. Accordingly, the relative positional relationship between the above-described measured marks 12A and 12B is changed by only an influence of the deflection about the axis of the second joint axis 11a2.

Referring to FIG. 10 again, after the above-described step S22, the control apparatus 14 captures an image of the two measured marks 12A and 12B at the same time by the camera 13 when the posture of the robot 11 is the above-described first measurement posture (step S23 in FIG. 10). The measured marks 12A and 12B of the second embodiment have the same circular pattern. A shape and dimensions of the measured mark 12A are respectively the same as a shape and dimensions of the measured mark 12B.

Further, the control apparatus 14 performs image processing on the image captured by the camera 13 and obtains a position $p^A_N$ and a dimension $d^A_N$ of the measured mark 12A on the image and a position $p^B_N$ and a dimension $d^B_N$ of the measured mark 12B on Lhe image (step S24 in FIG. 10). Subsequently, the above-described value N is incremented by one (step S25 in FIG. 10). Then, the control apparatus 14 determines whether the value N is larger than two (step S26 in FIG. 10), and if the value N is not larger than two, the above-described step S22 to step S25 are repeated.

By the above-described measurement processing, a position $p^A_1$ and a dimension $d^A_1$ of the measured mark 12A and a position $p^B_1$ and a dimension $d^B_1$ of the measured mark 12B on the camera image when the robot 11 is in the first measurement posture illustrated in FIG. 11 are obtained. Further, a position $p^A_2$ and a dimension $d^A_2$ of the measured mark 12A and a position $p^B_2$ and a dimension $d^B_2$ of the measured mark 12B on the camera image when the robot 11 is in the second measurement posture illustrated in FIG. 12 are obtained. When the value N is larger than two in the above-described step S26, the control apparatus 14 terminates the measurement of the two measured marks 12A and 12B by the camera 13.

Subsequently, the control apparatus 14 calculates a relative movement amount p" between the two measured marks 12A and 12B on the camera image from the positions $p^A_1$ and $p^A_2$ of the obtained measured mark 12A and the positions $p^B_1$ and $p^B_2$ of the obtained measured mark 12B (step S27 in FIG. 10).

After the step S27, the control apparatus 14 calculates an relative actual movement amount P between the two measured marks 12A and 12B in the world coordinate system from the relative movement amount p" between the two measured marks 12A and 12B and the dimensions $d^A_1$, $d^A_2$, $d^B_1$, and $d^B_2$ in the obtained camera image (step S28 in FIG. 10).

The step S27 and step S28 are more specifically described.

In the above-described step S27, the relative movement amount p" between the measured marks 12A and 12B is calculated. First, the control apparatus 14 respectively obtains coordinate values of the center of the measured mark 12A on the camera image in the respective measurement postures as the positions $p^A_1$ and $p^A_2$ of the measured mark 12A on the above-described camera image. Regarding the positions $p^B_1$ and $p^B_2$ of the above-described measured mark 12B, the control apparatus 14 also respectively obtains coordinate values of the center of the measured mark 12B on the camera image in the respective measurement postures. In this regard, the center of the measured mark 12A on the camera image in the above-described first measurement posture is expressed by coordinate values $(x^A_1, y^A_1)$, and the center of the measured mark 12A on the camera image in the above-described second measurement posture is expressed by coordinate values $(x^A_2, y^A_2)$. Further, the center of the measured mark 12B in the above-described first measurement posture is expressed by coordinate values $(x^B_1, y^B_1)$, and the center of the measured mark 12B in the above-described second measurement posture is expressed by coordinate values $(x^B_2, y^B_2)$.

The control apparatus 14 calculates a movement amount $p^A$ of the measured mark 12A on the camera image by subtracting the coordinate values $(x^A_1, y^A_1)$ on the camera image in the above-described first measurement posture from the coordinate values $(x^A_2, y^A_2)$ on the camera image in the above-described second measurement posture.

Further, the control apparatus 14 calculates a movement amount $p^B$ of the measured mark 12B on the camera image by subtracting the coordinate values $(x^B_1, y^B_1)$ on the camera image in the above-described first measurement posture from the coordinate values $(x^B_2, y^B_2)$ on the camera image in the above-described second measurement posture.

The control apparatus 14 calculates the relative movement amount p" between the measured marks 12A and 12B by subtracting the calculated movement amount $p^B$ from the coordinate values of the calculated movement amount $p^A$. The calculated result is also expressed as $p"=(p_x, p_y)$ using the coordinate system of the camera image in the same manner as that for the above-described first embodiment. The amount $p_x$ is a movement amount in the X direction of the coordinate system of the camera image and is a value obtained by subtracting $(x^B_2-x^B_1)$ from $(x^A_2-x^A_1)$. The amount $p_y$ is a movement amount in the Y direction of the coordinate system of the camera image) and is a value obtained by subtracting $(y^B_2-y^B_1)$ from $(y^A_2-y^A_1)$. Accordingly, the relative movement amount p" between the two measured marks 12A and 12B on the camera image is obtained.

Subsequently, the above-described step S28, namely processing for calculating the relative actual movement amount P between the two measured marks 12A and 12B is described.

The actual movement amount P of the measured mark 12 is expressed using the coordinate values $(P_x, P_y, P_z)$ of the world coordinate system defining the three-dimensional position of the robot 11. The definition of the world coordinate system is the same as that of the above-described first embodiment (see FIG. 3).

According to the present embodiment, the coordinate values $(p_x, p_y)$ expressing the relative movement amount p" between the two measured marks 12A and 12B on the camera image can be converted into the coordinate values $(P_x, P_y, P_z)$ of the above-described world coordinate system using a following formula (6).

[Formula 3]

$$\begin{bmatrix} P_x \\ P_y \\ P_z \end{bmatrix} = \begin{bmatrix} P_y \\ 0 \\ -p_x \end{bmatrix} \times 4D/(d_1^A + d_2^A + d_1^B + d_2^B) \qquad (6)$$

In the above-described formula (6), $(4D/(d^A_1+d^A_2+d^B_1+d^B_2))$ is magnification between the dimension D in the world coordinate system and an average value of the dimensions $d^A_1$, $d^A_2$, $d^B_1$, and $d^B_2$ on the camera image of the measured marks 12A and 12B having the same dimensions. According to the second embodiment, each of the dimensions D, $d^A_1$, $d^A_2$, $d^B_1$, and $d^B_2$ is a diameter (unit: mm) of the measured mark. The value of each of the dimensions $d^A_1$, $d^A_2$, $d^B_1$ and $d^B_2$ is obtained in the above-described step S22 to step S25 in FIG. 10. The value of the dimension D is measured and stored in the memory 17 of the control apparatus 14 in advance by an operator.

As can be seen from the above-described formula (6), the relative actual movement amount P between the two measured marks 12A and 12B is calculated by assuming that the +Y axis and the +X axis of the coordinate system of the image 13a illustrated in FIG. 8 respectively correspond to the +X axis and the −Z axis of the world coordinate system illustrated in FIG. 3. The values of $P_x$, $P_y$, and $P_z$ calculated by the above-described formula (6) express the relative actual movement amount P between the two measured marks 12A and 12B when the measurement posture of the robot 11 illustrated in FIG. 11 is changed to the measurement posture of the robot 11 illustrated in FIG. 12.

In this regard, according to the present embodiment, the relative movement amount p″ between the two measured marks 12A and 12B on the two-dimensional camera image is converted into the coordinate values in the world coordinate system as described above, and thus the value $P_y$ calculated by the above-described formula (6) is zero. Therefore, when the actual movement amount P is calculated, the actual movement amount P can be calculated using the values $P_x$ and $P_z$ calculated by the above-described formula (6). The formula is the same as the formula (2) described in the above-described first embodiment. According to the second embodiment, the calculated actual movement amount P corresponds to the deflection amount about the axis of the second joint axis 11a2 illustrated in FIG. 12.

As described above, the deflection measurement system 10 of the second embodiment obtains the deflection amount about the axis of the second joint axis 11a2 of the robot 11 on the basis of a variation in a relative position between the two measured marks 12A and 12B on the robot 11 measured by the camera 13. The calculation of the deflection amount is performed by the deflection amount calculation unit 32 in the CPU 16 of the control apparatus 14.

Subsequently, referring to FIG. 10 again, after the above-described step S28, the control apparatus 14 determines a spring constant of the second joint axis 11a2 using the relative actual movement amount P between the above-described two measured marks 12A and 12B, a variation in torque described below, the position of the measured mark 12A in the world coordinate system, and the like (step S29 in FIG. 10).

Contents of the above-described step S29 (determination processing of the spring constant) are described in detail below.

According to the second embodiment, as described above, the second joint axis 11a2 is regarded as a rotational spring, and a spring constant of the rotational spring is determined in advance so as to perform the positioning control on a tool on the tip end of the robot 11 in consideration of the deflection amount about the axis of the second joint axis 11a2. When the spring constant of the rotational spring is determined, the deflection amount (deflection angle) about the axis of the second joint axis 11a2 as the rotational spring can be estimated by dividing a value of the load torque acting on the rotational spring about the rotation axis of the spring by a value of the spring constant. When the above-described spring constant can be more accurately determined, the deflection amount (deflection angle) about the axis of the second joint axis 11a2 can be also estimated more accurately. When the above-described positioning control of the tool is performed, the target position of the tool is corrected based on the accurately estimated deflection amount about the axis of the second joint axis 11a2, and accordingly, the positioning accuracy of the tool on the tip end of the above-described robot can be improved.

Thus, the deflection measurement system 10 of the second embodiment can perform the processing for determining the spring constant about the axis of the second joint axis 11a2 by the spring constant calculation unit 33 in the control apparatus 14.

First, the rotational movement amount (rotation angle) about the axis of the second joint axis 11a2 when the load torque acts on the second joint axis 11a2 about the axis thereof is estimated. The rotational movement amount can be calculated by dividing the variation in the load torque acting on the second joint axis 11a2 about the axis thereof by the spring constant about the axis of the second joint axis 11a2 as expressed in a following formula (7).

$$M = (T2-T1)/k_2 \qquad (7)$$

In the above-described formula (7), M is an estimated value of the rotational movement amount about the axis of the second joint axis 11a2. The constant $k_2$ is the spring constant of the second joint axis 11a2 to be calculated.

The expression (T2−T1) in the above-described formula (7) is a variation in the load torque acting on the second joint axis 11a2 about the axis thereof. Specifically, a value of (T2−T1) is a value obtained by subtracting the load torque T1 acting on the second joint axis 11a2 about the axis thereof when the robot 11 is in the measurement posture illustrated in FIG. 11 from the load torque T2 acting around the axis of the second joint axis 11a2 when the robot 11 is in the measurement posture illustrated in FIG. 12.

Further, the values of the above-described load torque T1 and T2 are stored in the control apparatus 14 in advance. For example, when the robot 11 is in the measurement posture illustrated in FIG. 11 and in the measurement posture illustrated in FIG. 12, the control apparatus 14 respectively obtains torque values from values of electric current flowing in a motor rotationally driving the second joint axis 11a2 and stores the torque values in the memory 17 of the control apparatus 14. A value of the spring constant $k_2$ of the second joint axis 11a2 is not yet determined thus far. Thus, the rotational movement amount M estimated from the above-described formula (7) is a variable including the undetermined spring constant $k_2$.

Subsequently, a relative movement amount P′ between the two measured marks 12A and 12B when the second joint axis 11a2 is deflected about the axis of the second joint axis 11a2 due to the load torque acting on the second joint axis around the axis thereof 11a2 is estimated.

The estimated relative movement amount P′ between the two measured marks 12A and 12B can be calculated from a following formula (8) by assuming that a length of a circular arc having the above-described rotational movement amount M (rotation angle) as a center angle is the estimated movement amount P′. The formula (8) is the same as the formula (4) in the above-described first embodiment.

$$P' = r \times M \qquad (8)$$

In the above-described formula (8), "r" is a distance from a position of the axis center of the second joint axis $11a2$ in the world coordinate system to the center position of the measured mark 12A.

Regarding a value of the above-described distance r, an operator actually measures the distance r from the position of the axis center of the second joint axis $11a2$ in the world coordinate system to the center position of the measured mark 12A and stores the distance in the memory 17 of the control apparatus 14 in advance. The posture of the robot 11 when the distance r is actually measured may be the first measurement posture or the second measurement posture of the above-described robot 11.

The above-described formula (8) for calculating the above-described estimated movement amount P' may be replaced with a following formula (9) including the undetermined spring constant $k_2$ using the above-described formula (7).

$$P'=r\times((T2-T1)/k_2) \qquad (9)$$

In the above-described formula (9)), the values r, T1, and T2 other than the spring constant $k_2$ are already obtained and stored in the memory 17 of the control apparatus 14 as described above.

According to the second embodiment, the value of the spring constant $k_2$ of the second joint axis $11a2$ is determined so that a result of an expression on a right-hand side of the above-described formula (9) is equal to a value of the actual movement amount P calculated by the above-described formulae (6) and (2). In other words, the value of the spring constant $k_2$ is determined so that a difference between the above-described estimated movement amount P' and the actual movement amount P is zero. Accordingly, the spring constant $k_2$ of the second joint axis $11a2$ will be an accurate value conforming to the actual deflection amount about the axis of the second joint axis $11a2$.

Further, according to the second embodiment, the rotational movement amount about the axis of the second joint axis $11a2$, i.e. the deflection amount when the load torque acts on the second joint axis $11a2$ about the axis thereof in the world coordinate system can be estimated using the above-described formula (7). In this regard, the value of the spring constant $k_2$ calculated as described above is determined in advance in the above-described formula (7), and accordingly, the estimated value of the deflection amount can be obtained as an accurate value conforming to the actual deflection amount about the axis of the second joint axis $11a2$. Therefore, when the positioning control is performed on the tool on the tip end of the robot 11 as described above, the target position of the tool can be accurately corrected based on such estimated value of the deflection amount.

The CPU 16 of the control apparatus 14 of the second embodiment includes the spring constant calculation unit 33 for calculating the spring constant $k_2$ of the second joint axis $11a2$ as described above. It is preferable that the CPU 16 is to store the spring constant $k_2$ of the second joint axis $11a2$ calculated by the spring constant calculation unit 33 in the memory 17 and to read the constant from the memory 17 when controlling the robot 11.

Further, according to the above-described second embodiment, the deflection amount about the axis of the second joint axis $11a2$ in the world coordinate system is actually measured, and the spring constant of the second joint axis $11a2$ is determined based on the actual deflection amount. However, the present invention is not limited to the configuration which calculates the actual deflection amount and the spring constant about the axis of the second joint axis $11a2$ in the world coordinate system. In other words, according to the present invention, attachment positions of the two measured marks 12A and 12B on the robot 11 of the second embodiment may be changed to a place near a different joint axis, for example, the third joint axis $11a3$ or the fifth joint axis $11a5$, and an actual deflection amount and a spring constant of the third joint axis $11a3$ or the fifth joint axis $11a5$ may be calculated.

According to the above-described second embodiment, it is only necessary to obtain the relative actual movement amount between the two measured marks 12A and 12B, the deflection amount can be calculated even if the position of the camera 13 is changed when the robot 11 is in the first measurement posture and in the second measurement posture. Thus, according to the above-described second embodiment, an operator may capture an image of the two measured marks 12A and 12B on the robot 11 by holding the camera 13 without fixing the camera 13.

The two measured marks 12A and 12B of the second embodiment are marks of a combination of printed lines, but the present invention is not limited to such kind of mark. According to the present invention, a luminescent material may be used as each of the measured marks 12A and 12B. When the luminescent material is used as each of the measured marks 12A and 12B, a PSD may be used as the position measuring device instead of the camera 13. In other words, as is the case with the deflection measurement in the above-described first embodiment, a movement amount of the luminescent material on the PSD is obtained when the posture of the robot 11 is changed, and an actual deflection amount of a predetermined mechanism unit of the robot 11 may be measured from the movement amount.

Further, according to the above-described first and second embodiments, all an operator has to do is install the measured mark and the position measuring device such as a camera to obtain the actual deflection amount and the spring constant of the mechanism unit such as the link $11b1$ and the second joint axis $11a2$ as described above. In other words, the deflection measurement system according to the first and second embodiments enables an operator to obtain the actual deflection amount and the spring constant of the mechanism unit by a relatively easy operation.

Further, according to the above-described first and second embodiments, when a change in a position of the measured mark is measured by the position measuring device such as a camera and a PSD, the posture of the robot 11 is changed so that the relative positional relationship between the measured mark and the position measuring device is changed only depending on deflection of the mechanism unit. Accordingly, only the actual deflection amount generated in the mechanism unit can be accurately obtained. Since the accurately obtained actual deflection amount is used for calculation of the spring constant of the mechanism unit, the spring constant can be accurately determined.

Although the present invention has been described above using the articulated robot as an example, the present invention is not limited to a case in which deflection of the articulated robot is measured and can be applied to the deflection measurement of machines in general including a link mechanism connected by a plurality of joint axes.

Although the present invention has been described above with reference to the exemplary embodiments, it will be obvious for a person skilled in the art that various changes, omission, and addition may be made to each of the above-described embodiments without departing from the scope of the present invention. Further, appropriate combinations of each of the above-described embodiments are within the scope of the present invention.

EFFECT OF THE PRESENT INVENTION

According to the first, second, fourth, fifth and sixth aspects of the present invention, once an operator installs the measured mark and the position measuring device such as the camera to the robot and the vicinity thereof, the operator can obtain the actual deflection amount generated to the mechanism unit such as the link and the joint axis in response to the posture of the articulated robot. An installation operation of such measured mark and position measuring device is easier for the operator compared to an attachment operation of a weight and a rotation angle sensor of the conventional technique.

Further, according to the first and second aspects of the present invention, the actual deflection amount of the mechanism unit is calculated from a change in the position of the measured mark when the posture of the articulated robot is changed. Furthermore, when the change in the position of the measured mark is measured by the position measuring device, the posture of the articulated robot is changed so that the relative positional relationship between the measured mark and the position measuring device is changed only depending on deflection of the mechanism unit. Accordingly, only the actual deflection amount generated in the mechanism unit can be accurately obtained.

Further, according to the third aspect of the present invention, the accurately obtained actual deflection amount is used for calculation of the spring constant of the mechanism unit as described above, and thus the spring constant can be accurately determined.

The invention claimed is:

1. A deflection measurement system for measuring deflection of a mechanism unit of an articulated robot, comprising:
   a measured mark arranged on one of an arbitrary mechanism unit of the articulated robot and a position distant from the articulated robot;
   a position measuring device arranged on the other of the arbitrary mechanism unit of the articulated robot and the position distant from the articulated robot and configured to measure a position of the measured mark; and
   a control apparatus configured to respectively control the articulated robot and the position measuring device,
   wherein the control apparatus comprises:
   a robot control unit configured to change posture of the articulated robot so that a relative positional relationship between the measured mark and the position measuring device is changed only depending on deflection of the mechanism unit; and
   a deflection amount calculation unit configured to measure positions of the measured mark respectively before and after a change of the posture by the position measuring device and calculate an actual deflection amount of the mechanism unit based on a movement amount between the position of the measured mark measured before the change of the posture and the position of the measured mark measured after the change of the posture.

2. A deflection measurement system for measuring deflection of a mechanism unit of an articulated robot, the deflection measurement system comprising:
   two measured marks respectively arranged on two different links of the articulated robot;
   a position measuring device arranged on a position distant from the articulated robot to face both of the two measured marks and configured to measure positions of both of the two measured marks; and
   a control apparatus configured to respectively control the articulated robot and the position measuring device,
   wherein the control apparatus comprises:
   a robot control unit configured to change posture of the articulated robot so that a relative positional relationship between the two measured marks is changed only depending on deflection of a joint axis connecting the two links; and
   a deflection amount calculation unit configured to measure positions of both of the two measured marks respectively before and after a change of the posture by the position measuring device, and calculate an actual deflection amount of the joint axis based on a difference between a movement amount between the position of one measured mark of the two measured marks measured before the change of the posture and the position of the one measured mark measured after the change of the posture and a movement amount between the position of the other measured mark of the two measured marks measured before the change of the posture and the position of the other measured mark measured after the change of the posture.

3. The deflection measurement system according to claim 1, wherein the control apparatus further comprises:
   a spring constant calculation unit configured to obtain torque acting on the mechanism unit or the joint axis respectively before and after the change of the posture, calculate a variation between the torque obtained before the change of the posture and the torque obtained after the change of the posture, and calculate a spring constant of the mechanism unit when the mechanism unit is regarded as a rotational spring, on the basis of the calculated actual deflection amount, the variation in the torque, and a spatial position of the measured mark.

4. The deflection measurement system according to claim 1, wherein the measured mark is a luminescent material.

5. The deflection measurement system according to claim 1, wherein the position measuring device is a CCD camera.

6. The deflection measurement system according to claim 1, wherein the position measuring device is a PSD.

* * * * *